May 9, 1939.  W. R. COTHERN  2,157,481
UTILITY TOOL
Filed March 2, 1937

Inventor
W. R. Cothern

Patented May 9, 1939

2,157,481

UNITED STATES PATENT OFFICE 2,157,481

UTILITY TOOL

William R. Cothern, Scottsbluff, Nebr.

Application March 2, 1937, Serial No. 128,676

1 Claim. (Cl. 111—82)

This invention relates to a utility tool or implement especially designed for garden use, the primary object of the invention being to provide an implement or tool which may be used in cultivating or working the ground, planting and seeding in small gardens, window boxes or the like.

An important object of the invention is to provide an implement of this character which may be conveniently operated in forming furrows in planting small seeds, the seeds being held in the hollow portion of the device and released, in the desired number, by the thumb of the person using the implement.

A still further object of the invention is to provide a hand implement which may be efficiently employed in thinning small plants such as beets, turnips or the like.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
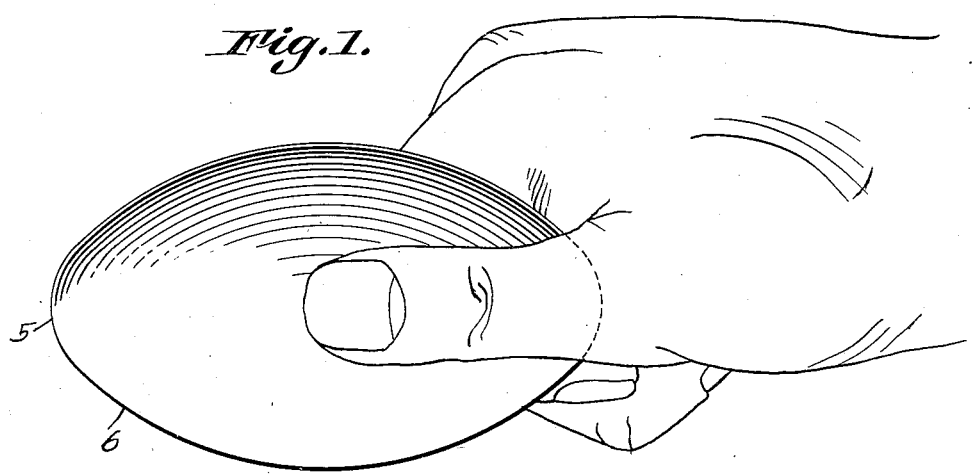
Figure 1 is a plan view of a garden implement constructed in accordance with the invention, and illustrating the manner of holding the implement in the hand while in use.
Figure 2:
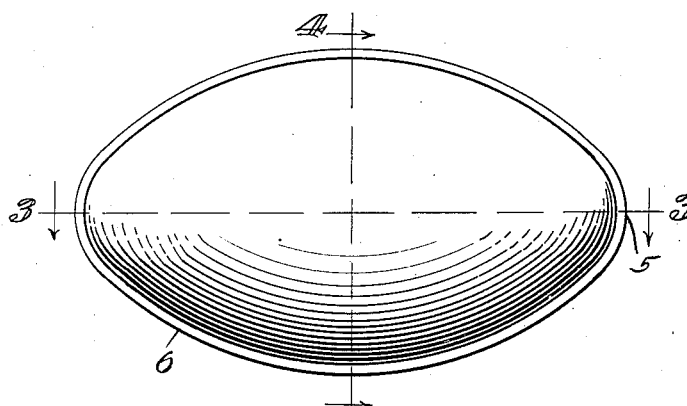
Figure 2 is a bottom plan view of the implement.

Referring to the drawing in detail, the implement comprises a substantially oval body portion of concavo-convex construction, the body portion being of a size which may be conveniently handled by the operator, in a manner as illustrated by Figure 1 of the drawing.

Figure 3:
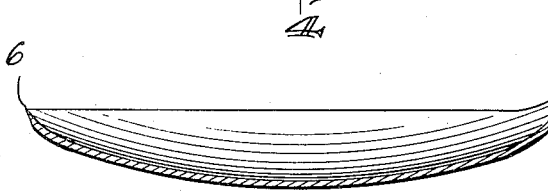
Figure 3 is a sectional view taken on line 3—3 of Figure 2.
Figure 4:
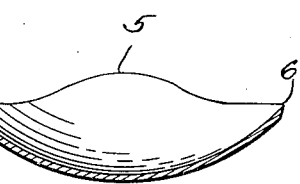
Figure 4 is a sectional view taken on line 4—4 of Figure 2.

As clearly shown in Figure 3, one end of the body portion extends slightly upwardly at 5, providing a sharp edge to be used in cultivating or loosening the ground around small plants.

Owing to the construction of the body portion, the upper or concaved surface of the body portion, near the end 5, is curved so that this end of the device may be conviently used in planting small seeds. The seeds are placed in the concaved portion of the body portion, where they are held under the thumb of the person planting, the thumb releasing the required number of seeds, when the thumb is lifted.

The edge of the body portion is beveled providing a cutting edge 6 along the entire upper edge of the body portion, so that in using the implement it is unnecessary to position the body portion so that any particular part of the cutting edge of the body portion is presented to the ground surface or soil under treatment.

Owing to the concavo-convex construction of the body portion, the implement may be conveniently held in the hand of the user without danger of the implement twisting or slipping while in use.

From the foregoing it will be seen that due to the construction shown and described, I have provided an implement which may be efficiently employed in cultivating the soil around small plants, or thinning small plants such as beets or the like, or for seeding purposes as previously described.

While I have shown and described the device as an implement for garden use, it is to be understood that there are a great many other uses for the implement, such as peeling potatoes, removing the eyes of potatoes, or hulling strawberries.

I claim:

A seed planting implement comprising an oval body portion adapted to conveniently fit within the hand of the user, one end of the body portion being extended outwardly beyond the remaining portion of the edge of the body, the extended end of the body portion being also concaved and pointed whereby seed held in the body portion may be fed over the concaved surface of the body portion into an opening formed by the pointed end of the body portion.

WILLIAM R. COTHERN.